Jan. 8, 1935.  G. C. FULLMER  1,987,473
COSMETIC HOLDER
Filed Jan. 26, 1934
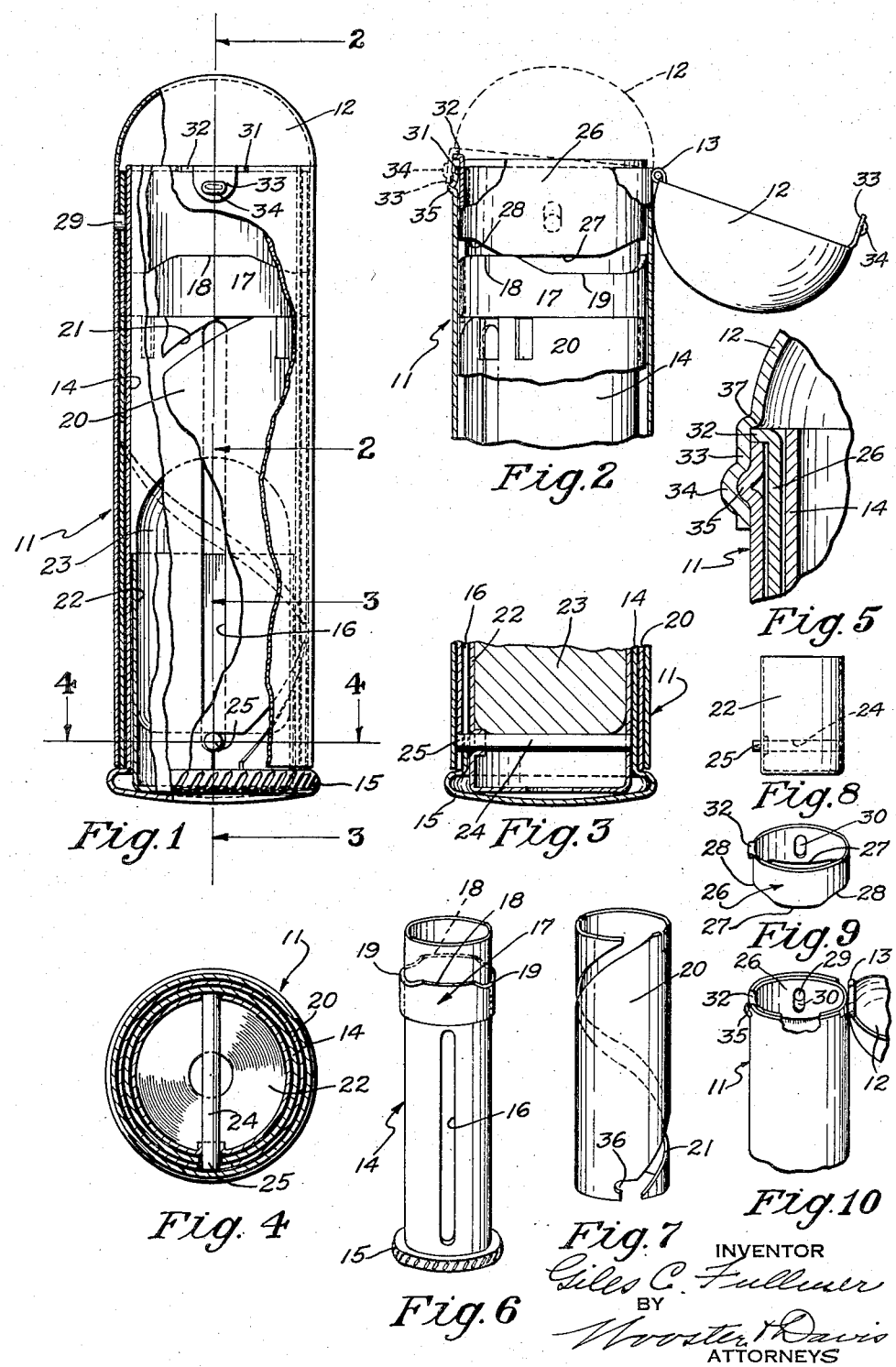
INVENTOR
Giles C. Fullmer
BY
Wooster & Davis
ATTORNEYS Patented Jan. 8, 1935

1,987,473

UNITED STATES PATENT OFFICE 1,987,473

COSMETIC HOLDER

Giles C. Fullmer, Bridgeport, Conn., assignor to The Bridgeport Metal Goods Manufacturing Company, Bridgeport, Conn., a corporation of Connecticut Application January 26, 1934, Serial No. 708,420

7 Claims. (Cl. 206—56)

This invention relates to new and useful improvements in cosmetic holders and has particular relation to a holder or container for lipstick, eyebrow pencil, shaving soap, and the like.

An object of the invention is to provide a cosmetic holder including a casing and a cover and improved means for opening the cover.

Another object of the invention is to provide a cosmetic holder including a casing and a cover and improved means operable on initial movement to open said cover and thereafter on further movement cause the cosmetic to be projected beyond one end of the casing for use.

Another object is to provide a simple and inexpensive means for the purpose stated and which means is reliable in operation and is concealed and does not require the slotting or otherwise marring of the outer surface of the casing or shell of the holder.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a front elevational view of the improved holder with parts broken away;

Fig. 2 is a sectional view taken substantially along the plane of the line 2—2 of Fig. 1 but showing the cover open;

Fig. 3 is a sectional view taken substantially along the plane of the line 3—3 of Fig. 1;

Fig. 4 is a transverse sectional view taken substantially along the plane of the line 4—4 of Fig. 1;

Fig. 5 is a detail sectional view on an enlarged scale showing the cover catch and the means for operating the same to open the cover.

Fig. 6 is a perspective view on a reduced scale showing the inner body or operating member;

Fig. 7 is a similar view showing the spiral;

Fig. 8 is a side elevational view on a reduced scale showing the carrier;

Fig. 9 is a perspective view on a reduced scale showing the upper cam sleeve employed; and Fig. 10 is a perspective view on a reduced scale showing the upper portion of the complete holder with the cover open.

Referring in detail to the drawing, the improved holder includes an outer open ended casing or shell 11 to one end of which is hinged at 13 a cover 12 whereby the cover is movable between a position closing said end of the casing and an open position at one side of the casing as best shown in Fig. 2. Within the casing 11 there is arranged an inner body or operating member 14, and such member at its outer or lower end is enlarged as at 15 providing a base and also providing a finger piece to be gripped and turned to rotate the operating member in the casing as will later appear. In this connection it is noted that the casing and operating member are each in the form of a cylinder.

Member 14 is provided with a longitudinally extending slot 16, the lower end of which is adjacent the enlarged or gripping portion 15 of the member and the upper end of which stops a distance short of the upper end of the member. Between the upper end of slot 16 and its extreme upper open end the member 14 carries a cam sleeve 17. This cam sleeve includes one or more high flat or straight edge portions 18 and lower or cut away edge portions 19 and the function of the cam sleeve will later be fully set forth. Here, however, it is noted that the cam sleeve is frictionally or otherwise tightly secured to the member 14 so that on turning movement of such member the cam sleeve will be turned with it.

Also, within the casing 11 is a member 20 having a spiral slot 21 therein. This member 20 is of less length than the operating member 14 and is disposed about the latter between its cam sleeve 17 and its enlarged or finger grip portion 15. The member 20 has a tendency to expand and frictionally engages the inner surface of the casing 11 and being disposed beneath the cam sleeve 17 of the operating member 14 secures such member and cam sleeve in the casing.

Within the operating member is arranged a carrier 22 into which is introduced the lower or inner end portion of a lipstick or the like 23. As shown, the carrier is in the form of a cup or cuplike member and is provided with a pin 24 extending there-across and having one end projecting beyond the side thereof at 25. This end 25 of the pin 24 extends through the slot 16 of the operating member and into the spiral slot 21 of the member 20.

Therefore, it will be understood that on turning movement of the member 14 the carrier 22 will be turned or rotated due to the fact that the end 25 of its pin 24 extends through the slot 16 of the member 14. As this end of the pin also extends into the spiral slot 21 it will ride against one edge of said slot as the member 14 is turned in one direction and will cause the carrier to be moved upwardly in the operating member and toward the cover end of the casing. As the operating member is rotated in the opposite direction the pin end 25 will ride against an opposite edge of the spiral slot and the carrier will be shifted downwardly in the casing. From this it will be seen that on rotation of member 14 in one direction the carrier may be moved to project the cosmetic beyond the cover end of the casing for use and on rotation of such member in the opposite direction the carrier may be moved to withdraw the cosmetic into the casing.

Within the cover end of the casing there is arranged an upper or movable cam member or cover operator preferably in the form of a sleeve 26 including one or more downwardly projected straight edge portions 27 (in the present instance two) and cut away edge portions 28, the said portions 27 and 28 substantially corresponding respectively with the edge portions 18 and 19 of the cam sleeve 17. The cam sleeve 26 is arranged just within the cover end of the casing and about the upper end portion of the operating member 14 and is secured against falling out of the casing and against turning movement in the casing by a short pin or stud 29 carried by the casing, or by a lug pressed from the casing, and entering a slot 30 in the cam sleeve. With this arrangement it will be apparent that the cam sleeve has a limited movement and the stud 29 and the slot 30 are so related that the cam sleeve is substantially flush with or slightly within the outer or cover end of the casing when in normal position and that the said sleeve is capable of movement through the cover end of the casing, the slot and stud limiting this last movement so as to prevent loss of the sleeve.

In its front wall at its upper or cover end, casing 11 is provided with a notch 31 which receives or accommodates a lip or extension 32 of the cam sleeve 26 when the latter is in normal position. On its free edge the cover 12 carries an extension or spring catch member 33 and such member has an outwardly pressed portion 34 to receive a projection 35 formed by pressing outwardly a portion of the wall of the casing 11 adjacent the upper end thereof. It is to be noted that the projection 35 is arranged immediately below and in line with the notch 31 and that the spring catch portion 33 on the cover extends across such notch and across the end of the lip or extension 32 when the cover is in closed position. The relationship of the parts is clearly shown in Fig. 5 and it will be noted that the projection 35 on the casing extends into the hollow side of the outwardly pressed portion 34 of the spring catch member when the cover is closed.

From Fig. 5 it will also be clear that the outwardly extending lip or lug 32 on the upper or movable cam sleeve 26 is so located as to lie under that portion 37 of the edge of the cover immediately inwardly of the catch extension 33. When the cam sleeve 26 is in normal position and the cover 12 is closed the relationship of the cam sleeves 17 and 26 is such that the high portion 18 of cam sleeve 17 is under or in line with the cut away portion 28 of the cam sleeve 26, and the pin 24 and carrier 22 are wholly within the holder so that the pin is at the inner end of the slot 16 and in the lateral extension 36 of the spiral slot 21.

With the parts in such positions should the operating member 14 be turned it will carry the cam sleeve 17 with it and on initial movement of the parts the portion 18 of said cam sleeve will ride under the portion 27 of the cam sleeve 26 and the latter will be shifted upwardly into the full line position of Fig. 2. During this movement the lip or extension 32 of the upper or movable cam sleeve engages the cover as at 37 in Fig. 5 and forces the cover upwardly springing the catch portion 33 over the lug or projection 35 on the casing. The action is such that the extension 33 is sprung or forced loose from the projection 35 and as the catch 33 is released from such projection the cover springs to the open position shown in Fig. 2.

It will be appreciated that the action of the cams to open the cover takes place on initial turning movement of the operating member 14. In fact the movement of such member to carry the pin end 25 out of the lateral extension 36 of the spiral slot 21 and into engagement with the inclined wall or edge of said slot opposite said extension is sufficient to operate the cams and cause them to function to open the cover as explained. On continued turning movement of the operating member the pin end 25 rides upwardly on an edge of the spiral slot as will be understood and the carrier is shifted toward the cover end of the casing so as to project the cosmetic for use. On return movement of the operating member the carrier is withdrawn into the casing and at the end of its movement the cams are positioned with the high portions 18 of cam 17 opposite the cut away portions 28 of cam 26 and with the lower or cut away portions 19 of cam 17 opposite the portions 27 of cam 26. Therefore, the cam 26 may fall into normal position or will readily move into such position as the cover is closed.

From the foregoing it will be appreciated that by the means of the present invention the cover is automatically opened on initial turning movement of the operating member 14 and that the cover is fully opened before the cosmetic is projected and that the cosmetic will not be forced against the inner side of the cover in a manner such as would destroy the shape of the cosmetic or result in its waste. The device is operated in the usual manner and causes the cover to be opened as an incident to the usual operation required to project the cosmetic and therefore requires no skill or special knowledge for its use. Further, the holder comprises but a minimum of parts each of which is so constructed that it will not get out of order due to repeated use.

Having thus set forth the nature of my invention, what I claim is:

1. In a cosmetic holder, an open ended casing, a cover hinged to one end of the casing, an operating member mounted for turning movements in the casing and projecting through the other end thereof, a cam sleeve within the casing adjacent the cover end thereof, means mounting said sleeve against turning movement in the casing but for movement longitudinally thereof toward the cover end to engage and open the cover, and a cam on the operating member and adapted to abut and shift the cam sleeve toward the cover end of the casing on turning movement of the operating member.

2. In a cosmetic holder, an open ended casing, a cover hinged to one end of the casing, an operating member in the casing and projecting through the other end thereof, a cam sleeve within the casing adjacent the cover end thereof and mounted for movement toward such end to engage and open the cover, said cam sleeve having an irregular inner edge comprising high and low portions, a cam on the operating member and including a portion normally opposite a low edge portion of the cam sleeve, and said cam shiftable into abutting engagement with a high portion of the edge of the cam sleeve on turning movement of the operating member to shift the cam sleeve toward the cover end of the casing.

3. In a cosmetic holder, an open ended casing, a cover hinged to one end of the casing, an operating member rotatable in the casing and projecting through the other end thereof, a cover opening member within the casing, means mounting said last member against turning movement in the casing and for movement toward the cover end of the casing whereby said member may engage and open the cover, and a cam carried by said operating member and positioned to abut and move said cover opening member toward the cover end of the casing on initial rotation of said operating member.

4. In a cosmetic holder, an open ended casing, a cover hinged to one end of the casing, a spring catch for securing the cover in closed position, an operating member rotatable in the casing and projecting through the other end thereof, a cam sleeve within the casing, means mounting said sleeve against the inner wall of the casing against turning movement in the casing and for movement toward the cover end of the casing whereby said sleeve may engage the cover and release said spring catch to open the cover, said sleeve having an irregular inner edge, and a cam sleeve carried by said operating member and having an irregular outer edge positioned to have a high portion abut a high portion of the irregular edge of the first cam sleeve and move the latter toward the cover end of the casing on rotation of said operating member.

5. In a cosmetic holder, an open ended casing, a cover hinged to one end of the casing, a spring catch for securing the cover in closed position, an operating member rotatable in the casing and projecting through the other end thereof, a cosmetic carrier in said operating member, a member between said operating member and casing and held against casual movement and having a spiral slot, said operating member having a longitudinally extending slot, means on said carrier and extending into said slots whereby on rotary movement of the operating member the carrier is moved toward and from the cover end of the casing, a cover opening member within the cover end of the casing, means mounting said cover opening member on and against turning movement in the casing and for movement toward said end of the casing to engage the cover and release the spring catch to open the cover, and means carried by said operating member and projecting laterally thereof below the cover opening member and above the spirally slotted member to abut and move the cover opening member toward the cover end of the casing on initial rotation of the operating member whereby the latter opens the cover on initial movement and on subsequent movement shifts the carrier toward the cover end of the casing.

6. In a cosmetic holder, an open ended casing, a cover hinged to one end of the casing, a spring catch for securing the cover in closed position, an operating member rotatable in the casing and projecting through the other end thereof, a cosmetic carrier in said operating member, means whereby on rotary movement of the operating member the carrier is moved toward and from the cover end of the casing, a cover opening member within the cover end of the casing, said member including a lip portion extending under the spring catch portion of the cover, means mounting the cover opening member on and against turning movement in the casing and for movement toward said end of the casing to have said lip portion engage the cover and release the spring catch to open the cover, and means on the operating member and including a cam surface to abut and move the cover opening member toward the cover end of the casing on initial rotation of the operating member whereby the latter opens the cover on initial movement and on subsequent movement shifts the carrier toward the cover end of the casing.

7. In a cosmetic holder, an open ended casing, a cover hinged to one end of the casing, a spring catch for securing the cover in closed position, an operating member rotatable in the casing and projecting through the other end thereof, a cosmetic carrier in said operating member, means whereby on rotary movement of the operating member the carrier is moved toward and from the cover end of the casing, a cover opening member within the cover end of the casing, said member including a lip portion extending under the spring catch portion of the cover, and cooperating cam means on the operating member and the cover opening member to shift the latter member to cause the lip to release the catch on operation of the operating member.

GILES C. FULLMER.